(12) United States Patent
Nyaribo et al.

(10) Patent No.: US 9,702,741 B2
(45) Date of Patent: Jul. 11, 2017

(54) IN STORE DISPLAY CALIBRATION SYSTEM

(71) Applicant: Apple Inc., Cupertino, CA (US)

(72) Inventors: Jeremiah Mosenge Nyaribo, San Francisco, CA (US); Mauricio M. Da Silva, Campbell, CA (US); Abel R. Flores, Morgan Hill, CA (US); Chris T. Schaeffer, Oakley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/491,927

(22) Filed: Sep. 19, 2014

(65) Prior Publication Data

US 2016/0084683 A1 Mar. 24, 2016

(51) Int. Cl.
| | | |
|---|---|---|
| *G01D 18/00* | (2006.01) | |
| *G01J 1/42* | (2006.01) | |
| *G01D 5/12* | (2006.01) | |
| *G06F 3/03* | (2006.01) | |
| *G01S 7/497* | (2006.01) | |
| *G01J 1/02* | (2006.01) | |
| *G01J 1/08* | (2006.01) | |

(52) U.S. Cl.
CPC .............. *G01D 18/00* (2013.01); *G01J 1/42* (2013.01); *G01S 7/497* (2013.01); *G06F 3/03* (2013.01); *G01J 1/0223* (2013.01); *G01J 1/08* (2013.01)

(58) Field of Classification Search
CPC .......... G02F 1/1309; G01D 18/00; G01J 1/42; G01J 1/0223; G01J 1/08; G06F 3/03; G01S 7/497
See application file for complete search history.

(56) References Cited

U.S. PATENT DOCUMENTS

| | | | | |
|---|---|---|---|---|
| 5,764,209 A | * | 6/1998 | Hawthorne | ......... G06F 11/2221 345/87 |
| 7,532,316 B2 | * | 5/2009 | Hachisuka | ............. G01N 21/95 349/192 |

(Continued)

FOREIGN PATENT DOCUMENTS

WO    WO0177697    10/2001

OTHER PUBLICATIONS

PCT Application No. PCT/US2015/023687—International Search Report and Written Opinion dated Jul. 15, 2015.

*Primary Examiner* — Huy Q Phan
*Assistant Examiner* — Adam Clarke
(74) *Attorney, Agent, or Firm* — Downey Brand LLP

(57) ABSTRACT

A test fixture used to calibrate an electronic device is disclosed. The test fixture includes several modules positioned on a rack. The modules may include either a stimulus member or light-absorbing material. An actuator connected to an end unit is configured to engage any one of the several modules and transport the module from the rack to a location over the electronic device. At least one module can calibrate a touch sensor of the electronic device, while at least another module can calibrate a proximity sensor of the electronic device. In some cases, an additional module is configured to calibrate a touch sensor of a second electronic device, such as a previous generation of an electronic device or an electronic device having a different dimension. The electronic device can lie on a cradle that may be identified by a feature on the cradle, such as a magnet.

20 Claims, 10 Drawing Sheets

(56) References Cited

U.S. PATENT DOCUMENTS

| | | |
|---|---|---|
| 2005/0146347 A1 | 7/2005 | Yevmenenko |
| 2009/0273584 A1 | 11/2009 | Staton et al. |
| 2010/0060590 A1 | 3/2010 | Wilson et al. |
| 2012/0235029 A1* | 9/2012 | Tam .................. G01D 18/00 250/252.1 |
| 2014/0055147 A1* | 2/2014 | Haylock ............... G01R 1/04 324/602 |
| 2014/0145743 A1 | 5/2014 | Kanev et al. |

* cited by examiner

IN STORE DISPLAY CALIBRATION SYSTEM

FIELD

The described embodiments relate generally to a test fixture for electronic devices. In particular, the present embodiments relate to a test fixture that calibrates an electronic device having replacement part in order to restore the electronic device to the original factory settings.

BACKGROUND

Tests fixtures may be used to configure or calibrate an electronic device to include desired settings or parameters. This equipment is useful when replacement parts are installed on the device and need to be configured. Alternatively, the test fixture may be used to restore the device to the original factory settings.

However, traditional test fixtures include several drawbacks. For instance, test fixtures are designed to configure or calibrating a particular electronic device. A "particular" device includes a specific generation of a device, or a specific size of a device. As a result, when, for example, a next generation of a device is released, the current test fixture is incapable of calibrating the device. Also, traditional test fixtures include multiple housings. Each housing may include multiple moving parts configured to calibrate a particular component of the device. As a result, a single device having multiple components requires placing the device into a first housing, calibrating the device, removing the device, and then placing the device into a second housing. This adds complexity and time to the process. Further, traditional test fixtures may include parts actuated by an air compressor which, in additional to multiple housings, increases the overall footprint of the test fixture.

SUMMARY

In one aspect, a system for calibrating electronic devices is described. The system may include a first module that calibrates a first component of an electronic device. The first module may include a first end having a conductive rubber. The first module may also include a second end opposite the first end. The second end may include a magnetically attractable member. The first module may also include a bracket formed from a metallic material. The bracket may be electrically connected to the conductive rubber. The system may further include a second module that calibrates a second component of an electronic device. The second module may include a first end having a material capable of absorbing infrared light. The second module may further include a second end opposite the first end. The second end may include a magnetically attractable member. The system may also include a sensor. The system may also include a cradle that receives the electronic device. The cradle may include an element detected by the sensor to identify the cradle. The system may also include an end unit attached to an actuator. In some embodiments, the end unit and the actuator move the first module from a first position to a second position. In some embodiments the second position may be proximate to the electronic device.

In another aspect, a method for calibrating an electronic device is described. The method may include electrically connecting a connector to the electronic device. The method may also include engaging a module with an end unit. The module may include a conductive rubber and an opening. The end unit may include a magnet an alignment pin capable of extending through the opening of the module. The method may further include transporting the module from a first position to a second position via an actuator. In some embodiments, the second position is a location such that the conductive rubber engages a touch sensor of the electronic device. The method may further include sending an electrical signal to the electronic device. In some embodiments, the electrical signal activates the touch sensor.

In another aspect, a non-transitory computer readable storage medium configured to store instructions that, when executed by a processor included in a computing device, cause the computing device to perform the steps described herein. One step may include electrically connecting a connector to the electronic device. Another step may include engaging a module with an end unit. The module may include a conductive rubber and an opening. The end unit may include a magnet an alignment pin capable of extending through the opening of the module. Another step may include transporting the module from a first position to a second position via an actuator. In some embodiments, the second position is a location such that the conductive rubber engages a touch sensor of the electronic device. Another step may include sending an electrical signal to the electronic device. In some embodiments, the electrical signal activates the touch sensor.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
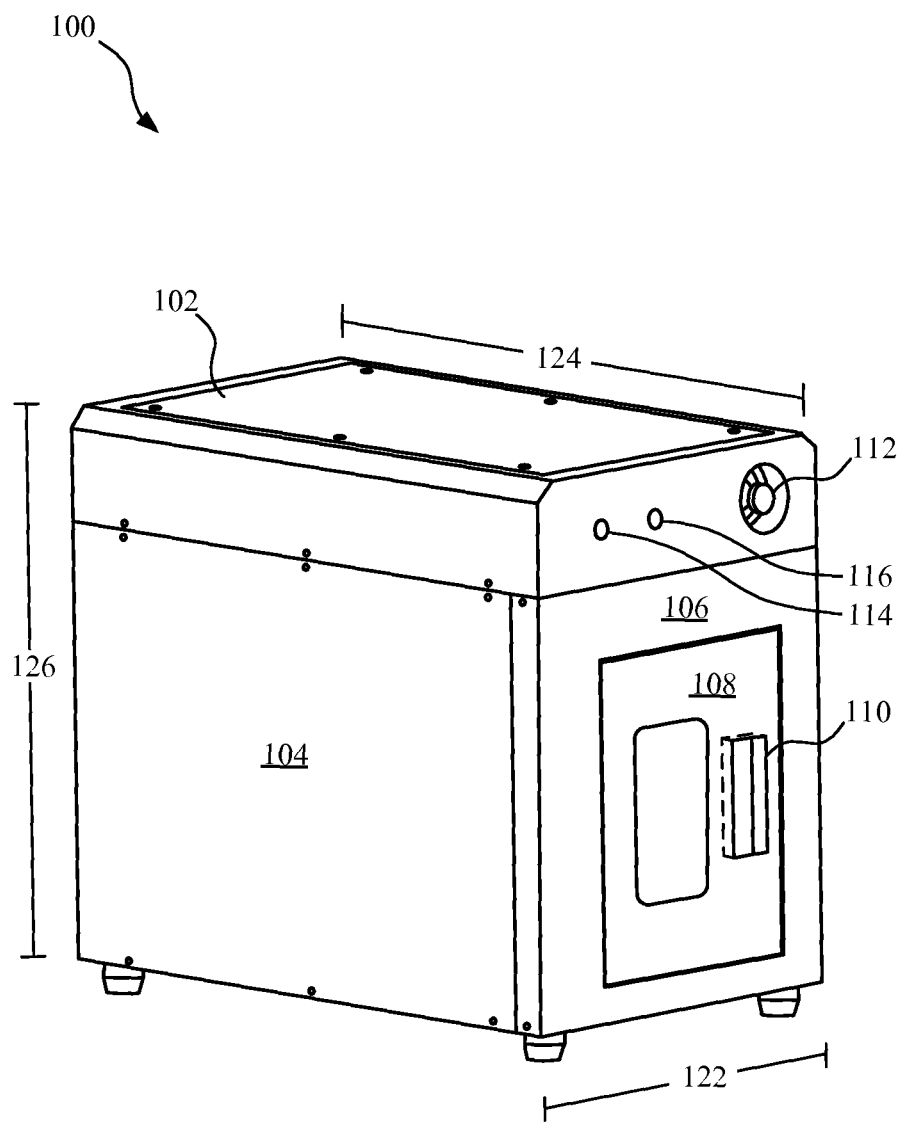
FIG. 1 illustrates an isometric view of an embodiment of a fixture.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a fixture configured to test and calibrate electronic devices. For example, the fixture may be configured to calibrate replacement parts, such as sensors, installed on the electronic device. The sensors may include an electronic proximity sensor, a touch sensor integrated with a display panel, a pressure sensor, or a fingerprint sensor. The fixture includes a modular design that includes removable racks. In order to calibrate the device, the removable racks are designed to hold several modules (or stimulus pads), with each module configured to provide a stimulus or arousal to a sensor of the electronic device. An end unit (or end effector) attached to an actuator can magnetically couple to any one of the modules and transport the module to a location proximate to the electronic device, then return the module to the rack. Not only are some modules designed to calibrate a particular sensor or sensors, but other modules are also designed to calibrate previous generation electronic device. This allows for a fixture having a single, unitary housing to calibrate and test multiple embodiments of electronic devices.

In addition, the fixture having a "pick-and-place" process described above does not require manual tools during operation. Also, an executable program (e.g., software) stored on a computing device (e.g., desktop or laptop computing device) is designed to operate components within the fixture. In this manner, the fixture requires minimal training by an end user. For example, the executable program includes a simple interface that prompts the user to begin the test and calibration. Also, the fixture is designed to have a relatively small footprint such that the fixture may be placed in a discrete location such as a retail store in order to provide local test and calibration to the electronic device. In other words, when components of an electronic device are damaged, the device may be taken to the retail store to receive new components and a subsequent test and calibration of the new components. In this manner, the electronic device need not be shipped to the manufacturer of the device. Alternatively, the fixture may be used as a validation point or process in a factory line used to manufacture the electronic device. Further, unlike traditional fixtures, the fixture described in this detailed description relies on electrical current for actuation of parts, rather than an air compressor.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 illustrates an isometric view of an embodiment of fixture 100. Fixture 100 may be configured to test and calibrate several components (e.g., sensors) of an electronic device (not shown). External features of fixture 100 may include hood region 102 and several panels, including first panel 104 and second panel 106. Second panel 106 may include door 108, shown in a closed configuration in FIG. 1. Door 108 may be in an open configuration by using handle 110 to open door 108. Once door 108 is in an open configuration, an electronic device may be inserted into fixture 100.

Fixture 100 may be configured to calibrate one or more components or features of an electronic device. For example, fixture 100 may calibrate the brightness of a display panel, that is, the luminance attributed to the light source (e.g., display panel). Further, fixture 100 may calibrate a white point of the display panel, that is, a set of color values that define color white for the display panel. Also, fixture 100 may calibrate touch sensors integrated within the display panel such that a touch event associated with activating the touch sensor is substantially similar to that of the original factory settings. Also, fixture 100 may be configured to calibrate other sensors, such as a TOUCH ID®, a fingerprint sensor made by Apple, Inc., of Cupertino, Calif.

Fixture 100 may include additional features. For example, fixture may include button 112 used a safety input in order to stop fixture 100 when fixture 100 is performing a test or calibration of an electronic device. Further, fixture 100 may include several indicators, such as first indicator 114 and second indicator 116, that may illuminate to signal fixture 100 is performing a specific function or if fixture 100 has completed a calibration and/or test. In some embodiments, fixture 100 is a standalone device capable performing the calibration and test procedures with hardware and software fully enclosed within fixture 100. In the embodiment shown in FIG. 1, 100 is configured to connect to a computing device (not shown), such as a desktop computing device or a laptop computing device, having an executable program used by a user to control and operate fixture 100. Connections means between fixture 100 and the computing device may include a cable (wire) or a wireless (e.g., Wi-Fi) connection. The executable program may be software program having an interface displayed on a monitor of the computing device. Once fixture 100 calibrates the electronic device, the executable program along with fixture 100 may be used to perform a test to confirm the electronic device is properly calibrated. These test results may be uploaded to a database where the manufacture can create a log indicating work performed on the electronic device.

Fixture 100 may also include dimensions suitable for discrete locations. For example, fixture may include first dimension 122 approximately in the range of 11 to 13 inches, second dimension 124 approximately in the range of 16 to 20 inches, and third dimension 126 approximately in the range of 18 to 22 inches.

Fixture 100 can not only calibrate a mobile telecommunications device, such as an IPHONE®, from Apple, Inc., of Cupertino, Calif., but fixture 100 may also be configured to calibrate a tablet computing device, such as an IPAD®, from Apple, Inc., of Cupertino, Calif. Moreover, fixture 100 may be designed to calibrate previous versions (or generations) of the aforementioned devices, which may include different dimensions.

Figure 2:
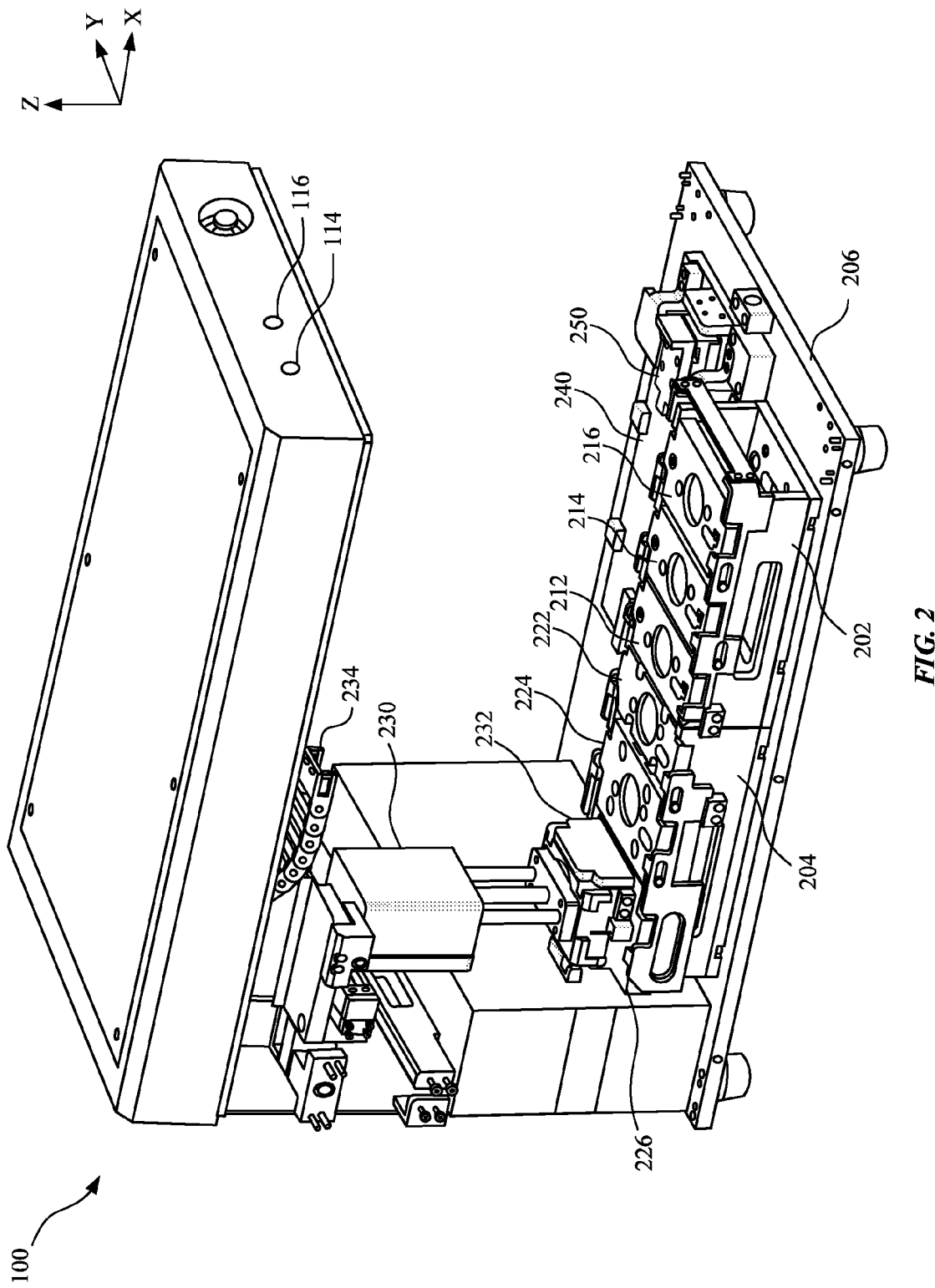
FIG. 2 illustrates an isometric view of a fixture having the first panel and the second panel removed.

FIG. 2 illustrates an isometric view of fixture 100 having first panel 104 and second panel 106 (shown in FIG. 1) removed to show internal components and features of fixture 100. Fixture 100 may include first rack 202 and second rack 204 positioned on plate 206. First rack 202 and second rack 204 may be made from rigid materials, such as aluminum or steel. First rack 202 and second rack 204 are designed to carry several modules used by fixture 100 to calibrate an electronic device (not shown). In some embodiments, the modules are stimulus pads configured to create a stimulus or arousal of a component or components of an electronic device. This will be discussed below. First rack 202 and second rack 204 may include different designs or dimensions to accommodate various modules used in fixture 100. Accordingly, plate 206 may include various openings configured to receive racks having different dimensions.

First rack 202 includes first module 212, second module 214, and third module 216. First module 212 may be configured to calibrate a touch sensor of a first electronic device, while second module 214, and third module 216 may be configured to calibrate a second electronic device and a third electronic device, respectively. The second electronic device and the third electronic device may be different generations of the first electronic device, such as a previous generation, or alternatively, a subsequent generation. Also, the second electronic device and the third electronic device include at least one different dimension than that of the first electronic device.

As shown in FIG. 2, second rack 204 includes first module 222, second module 224, and third module 226. First module 222 may be designed to calibrate a proximity sensor used in an electronic device used to determine, for example, the distance from a user to the electronic device. In some embodiments, a proximity sensor is a photoelectric sensor configured to send and receive infrared light. As a result, first module 222 may include characteristics different from those of first module 212, and will be discussed below. Third module 226 may also be configured to provide a stimulus to an electronic device. Fixture 100 further includes a robotic assembly include actuator 230 configured to provide movement of end unit 232 in a z-direction. In some embodiments, end unit 232 is an end effector configured to couple (e.g., magnetically couple) with a module. End unit 232 is designed such that any one of several actuators may be used, such as a stepper motor or a servo motor. Also, it will be appreciated that the modules may be ordered on first rack 202 and second rack 204 in any manner such that fixture 100 recognizes the location of the individual modules.

Actuator 230 and end unit 232 may also be part of a track (not shown) to provide movement to actuator 230 and end unit 232 in the x- and y-directions. The track may be used in conjunction with chain 234 (partially shown). In this manner, end unit 232 may traverse in three dimensions in order to transport modules to various locations throughout fixture 100. It will be appreciated that executable program previously described includes instructions for operating actuator 230 and end unit 232 in the described manner.

Fixture 100 further includes cradle 240 that receives an electronic device. Also, cradle 240 is designed and manufactured to limit or restrict movement of the electronic device. Generally, fixture 100 is designed to allow any one of the modules in an initial position, that is, on first rack 202 or second rack 204, to be transported by means previously described to a second position, generally associated with a location proximate to cradle 240, and in particular, proximate to an electronic device positioned within cradle 240. Further, the location may correspond a position such that first module 212 engages a sensor (e.g., touch sensor) of the electronic device to perform a calibration of the sensor. In another example, end unit 232 may return first module 212 (on first rack 202), engage first module 222 (on second rack 204), and transport first module 222 to a location proximate to another sensor (e.g., proximity sensor) of the electronic device. This may be a location such that a portion of first module 222 hovers over the sensor.

Fixture 100 further includes bracket 250 having a connector (not shown) capable of mating with the electronic device. For example, bracket 250 may extend in a direction toward the electronic device such that the connector electrically couples with the electronic device. This step may be performed by manual or automated means. In this manner, fixture 100 along with the executable program can send an electrical signal to the electronic device, such as a display panel and/or a sensor (or sensors) previously described. In this manner, a module may interact with the electronic device in order to calibrate a sensor or sensors. In some cases, images or visual content on the display panel influence the touch sensors. However, fixture 100 is designed to illuminate the display panel so that testing and calibrating is performed during the illumination. Further, after one or several calibration procedures, fixture 100 along with the executable program can retrieve from the electronic device the results of the testing. If the test is within an acceptable tolerance, fixture 100 and/or the executable program can indicate a "pass" to the user and write or store the settings to the electronic device. In this manner, the electronic device, which may include replacement parts, now includes settings substantially similar to those initially stored in the electronic device at the factory. When the calibration and testing procedures are complete, the information can be stored by the computing device and/or uploaded to a database. Then, bracket 250 can be actuated in a direction away from the electronic device to remove the connector, and the electronic device may be removed.

Also, as shown in FIG. 2, end unit 232 is engaged with third module 226. While this configuration may be used to transport third module 226, this may also be a "parking" feature used to seat end unit 232 in a manner such that end unit 232 will not be damaged during transportation of fixture 100. A block (not shown) protruding from end unit 232 may include a threaded opening used to receive a fastener to secure end unit 232.

Fixture 100 may also include an internal light (not shown) to improve visibility. Features such as an internal light, first indicator 114, second indicator 116, actuator 230, end unit 232, the connector and the modules may be electrically coupled to an electrical ground to provide a return path for electrical current. However, in order to improve the calibration and testing procedures, end unit 232, the connector and at least some of the modules may be electrically coupled to an electrical ground different from the electrical ground used for other components. In this manner, some components of end unit 232, the connector and at least some of the modules may be part of an electrical circuit having a common electrical ground. This isolated ground improves the stimulation values generated by the modules during calibration, and accordingly, improves the calibration process.

Figure 3:
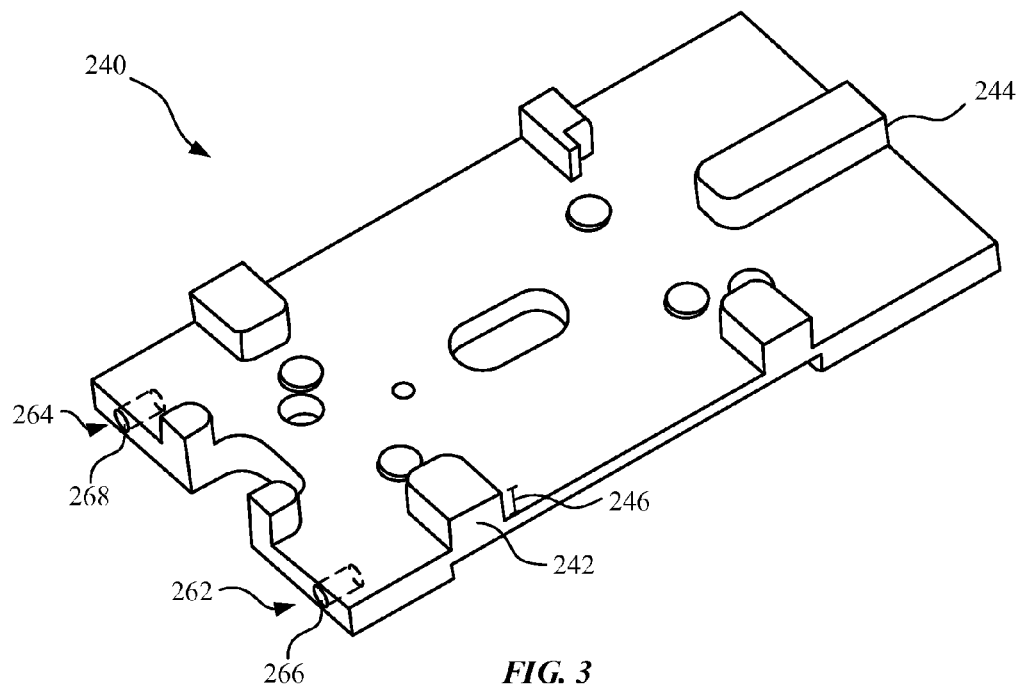
FIG. 3 illustrates an isometric view of an embodiment of a cradle.

FIG. 3 illustrates an isometric view of an embodiment of cradle 240. In some embodiments, cradle 240 is formed from machining a substrate. In some embodiments, the substrate is a rigid material, such as plastic. In the embodiments shown in FIG. 3, cradle 240 is formed from an acetal substrate. Cradle 240 may include several protrusions used to limit movement. For example, first protrusion 242 and second protrusion 244 may be configured to limit movement of the electronic device in two dimensions. Cradle 240 may be designed differently for different electronic devices, in order to accommodate the various dimensions of the devices. The associated heights of the protrusions are generally similar and are designed to be less than a height of the electronic device. For example, first protrusion 242 includes height 246 that is less than a height of an electronic device to be used in cradle 240. In this manner, a module previously described may engage a portion of the electronic device without contacting any of the protrusions.

Also, cradle 240 may include first opening 262 and second opening 264. First opening 262 and second opening 264 may be used to receive a structure to identify cradle 240. For example, first opening 262 and second opening 264 may include first magnet 266 and second magnet 268, respectively. First magnet 266 and second magnet 268 may be of any magnetic polarity (e.g., north pole, south pole). Also, first magnet 266 and second magnet 268 may be of the same magnetic polarity or of a different magnetic polarity. In this manner, cradle 240, which may be prefabricated for particular electronic devices, may include a particular combination of polarities of first magnet 266 and second magnet 268. For example, both first magnet 266 and second magnet 268 may both include first polarity. This may allow fixture 100 to identify cradle 240 using first magnet 266 and second magnet 268. Although first opening 262 and second opening 264 are generally cylindrical, first opening 262 and second opening 264 may include any shape corresponding to first magnet 266 and second magnet 268.

Figure 4:
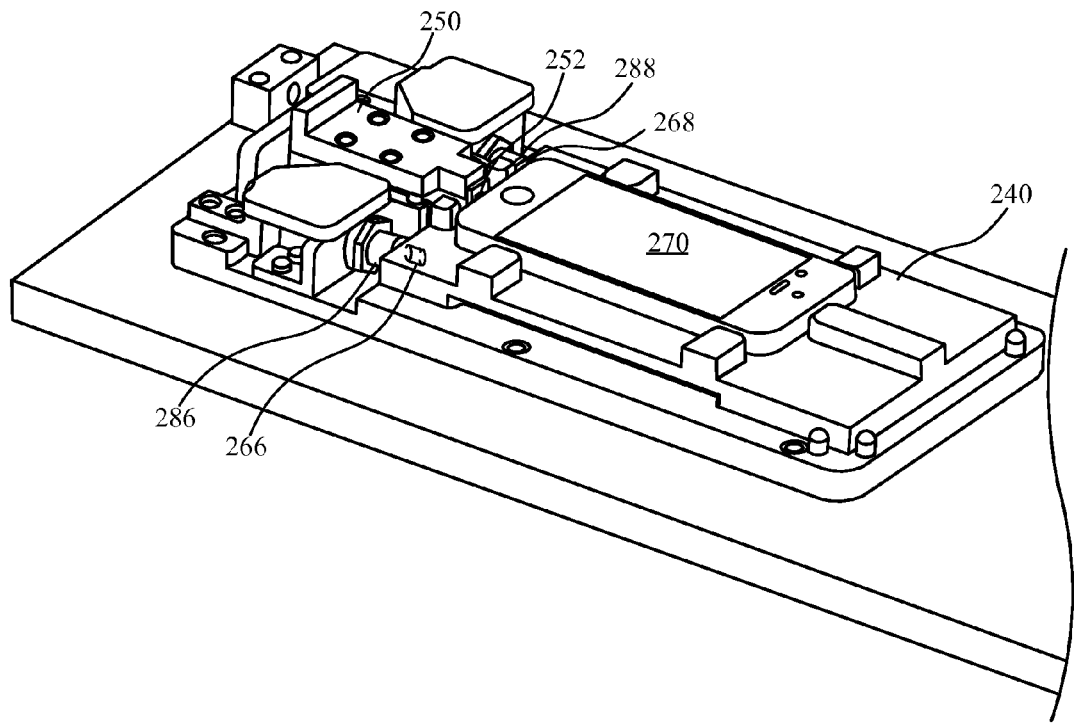
FIG. 4 illustrates an isometric view showing an enlarged portion of the fixture in FIG. 2, with an electronic device positioned within the cradle, in accordance with the described embodiments.

FIG. 4 illustrates an isometric view showing an enlarged portion of fixture 100 in FIG. 2, with electronic device 270 positioned within cradle 240. Also, bracket 250 is moved to a position such that connector 252 is electrically connected to electronic device 270. Fixture 100 further includes sensors, such as first sensor 286 and second sensor 288. In some embodiments, first sensor 286 and second sensor 288 are proximity sensors configured to detect a position of cradle 240. In this case, a proximity sensor may be an optical sensor or a slot sensor. In the embodiment shown in FIG. 4, first sensor 286 and second sensor 288 are bi-polar Hall effect sensors configured to determine not only the presence of a magnet but also the polarity of the magnetic. In this manner, first sensor 286 may detect first magnet 266 within cradle 240 as well as the magnetic polarity of first magnet 266. Also, second sensor 288 may detect second magnet 268 within cradle 240 as well as the magnetic polarity of second magnet 268. As a result, fixture 100 and the executable program may use the polarities to identify electronic device 270 in fixture 100 based on the magnetic polarity of first magnet 266 and second magnet 268 within cradle 240. Stated differently, each cradle 240 is uniquely tailored receive a particular electronic device 270. Accordingly, each cradle 240 includes a unique combination or permutation of polarities from first magnet 266 and second magnet 268. This identification process allows the executable program to run a stored program (e.g., calibration and test program) tailored to electronic device 270 without the user having to determine the correct stored program.

Figure 5:
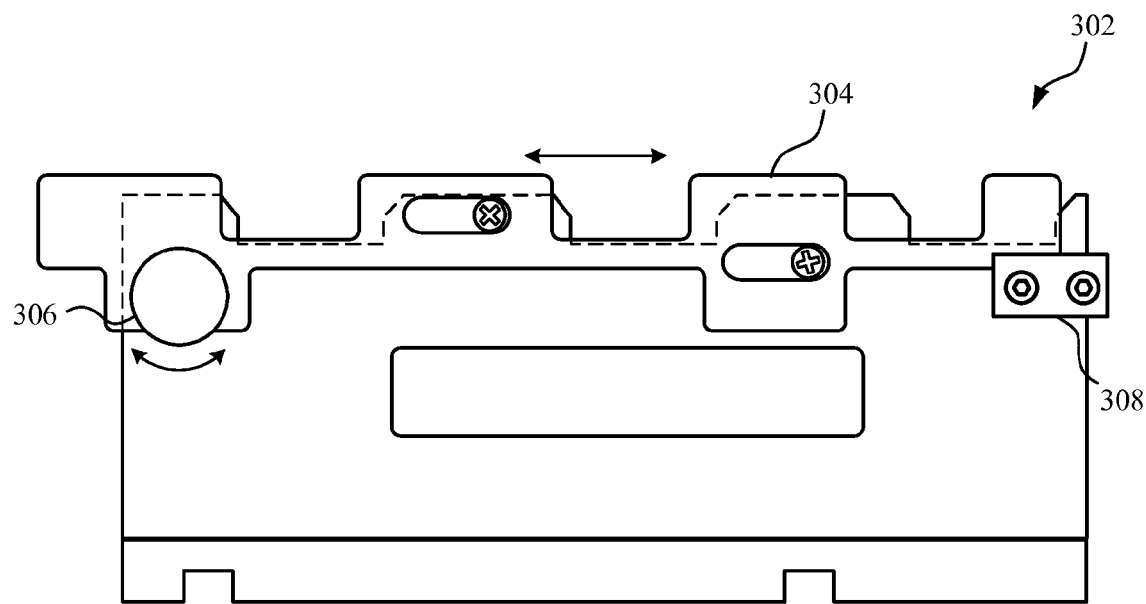
FIG. 5 illustrates a side view of an embodiment of a rack having a rack door and a rack knob, in accordance with the described embodiments.
Figure 6:
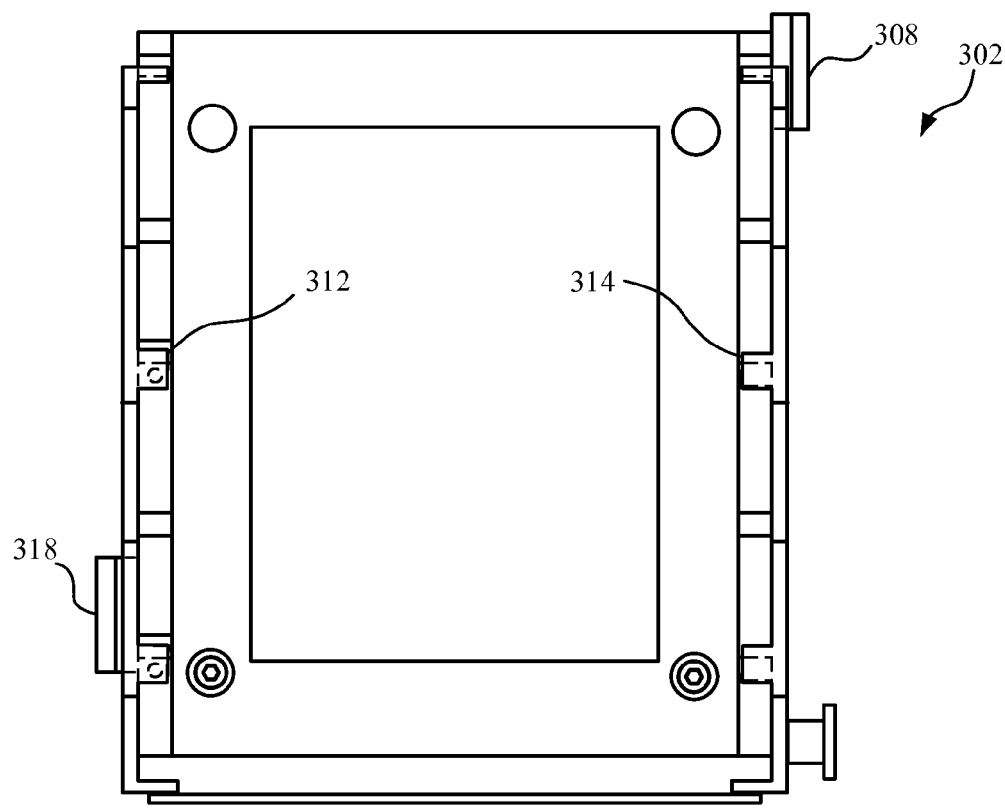
FIG. 6 illustrates a top view of a rack showing a rack door having several extensions, such as a first extension and a second extension.

FIGS. 5 and 6 illustrate an embodiment of a rack (similar to first rack 202 shown in FIG. 2) used to hold the modules. FIG. 5 illustrates a side view of an embodiment of rack 302 having rack door 304 and rack knob 306. Rack door 304 may be designed as a lock to regulate the modules. Rack door 304 is designed to move laterally along rack guide 308 with respect to rack 302, and may include several extensions (not shown). When rack door 304 is in an unlocked position, the modules previously described may be removed either manually or by end unit 232 (shown in FIG. 2). When the rack door 304 is in a locked position, the modules may not be removed. This may be useful during transportation of fixture 100 (shown in FIG. 2) to prevent damage to the modules. Rack knob 306 may regulate movement of rack door 304. For example, rack knob 306 may be rotated clockwise to prevent movement of rack door 340 and rotated counterclockwise to allow movement of rack door 304. Also, rack door 304 may be made from any material previously described for making first rack 202 and second rack 204 (shown in FIG. 2).

FIG. 6 illustrates a top view of rack 302 showing rack door 304 having several extensions, such as first extension 312 and second extension 314. When rack door 304 is in a locked position, the extensions are positioned over the modules (not shown) in a manner such that the modules may not be removed. Conversely, when rack door 304 is in an unlocked position, the extensions are positioned in locations not over the modules in a manner such that the modules may be removed. Also, to provide additional lateral support, rack 302 may include second rack guide 318 in addition to rack guide 308.

Figure 7:
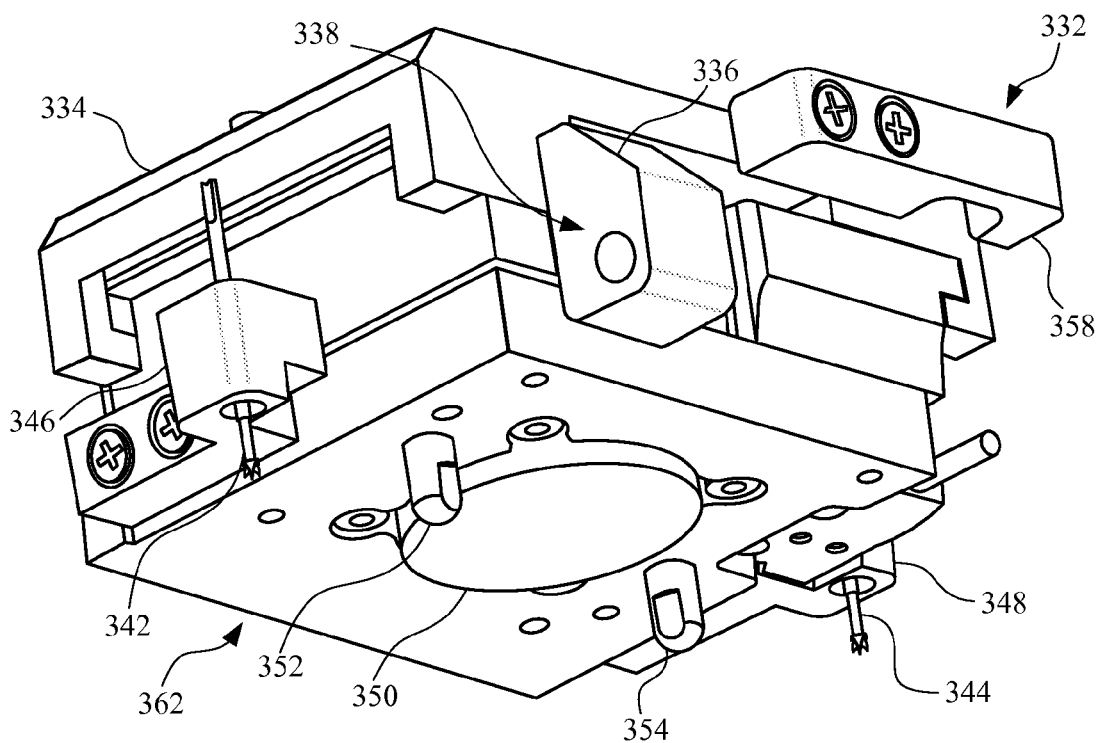
FIG. 7 illustrates an isometric view of an embodiment of an end unit used to transport modules, in accordance with the described embodiments.

FIG. 7 illustrates an isometric view of an embodiment of end unit 332 used to transport modules, in accordance with the described embodiments. End unit 332 may include attachment block 334 configured to couple with an actuator (not shown). End unit 332 may further include block 336 used to secure end unit 332 in place, or "park" end unit 332, in a manner previously described. In some embodiments, block 336 includes opening 338 configured to receive a structure such that end unit 332 remains stationary. In some embodiments, opening 338 is threaded to receive a threaded structure. End unit 332 further includes first pin 342 and second pin 344 secured to end unit 332 by first bracket 346 and second bracket 348, respectively. In some embodiments, first pin 342 and second pin 344 pogo pins having a spring-loaded feature allowing movement along the length of first pin 342 and second pin 344, respectively. Generally, first pin 342 and second pin 344 are made from electrically conductive materials (e.g., metal). Also, first pin 342 and second pin 344 may be electrical connected to a common electrical ground as that of connector 252 (shown in FIG. 4). Further, first pin 342, second pin 344, and connector 252 may be part of an isolated electrical circuit having an electrical ground not shared by some components (e.g., an actuator). Further, in some embodiments, the modules include metal brackets (shown below) electrically connected to stimulus material used to calibrate the electronic device. In these embodiments, when the module is coupled to end unit 332, first pin 342 and second pin 344 are configured to contact the metal brackets such that the modules shares the same electrical ground as first pin 342, second pin 344, and connector 252.

In order to attach to a module, end unit 332 may include magnet 350. In some embodiments, magnet 350 is a permanent magnet. In the embodiment shown in FIG. 7, magnet 350 is part of a magnetic assembly further include an electromagnetic configured to provide additional magnetic attraction with a module. In other words, the magnetic field lines of magnet 350 along with electromagnetic field lines of the electromagnet maintain a desired coupling with a module. This may serve several purposes. For instance, if a power outage to the fixture (e.g., fixture 100) occurs, magnet 350 is capable maintaining the module. Also, in order to decouple or disengage end unit 332 from a module, the electromagnet magnet may receive an electrical current in a reverse direction thereby generating an electromagnetic field in a direction opposite the initial direction. As a result, the newly created electromagnetic field provides a repulsive force which overcomes the attractive force of magnet 350, and the module releases from end unit 332.

In order to properly align end unit 332 with a module, end unit may include alignment pins, such as first alignment pin 352 and second alignment pin 354, both of which are configured to extend through openings of a module.

End unit 332 may further include cable routing block 358 configured to route cables of end unit 332 such that the cables are not in the path of end unit 332, the actuator, and/or the modules during movement. Further, cable routing block 358 prevents cables from being stressed when end unit 332 moves to various positions. Cable routing block 358 may also be used as an anchor for grounding cables (not shown) attached to first pin 342 and second pin 344. Also, end unit 332 may further include surface 362 configured to mate a plate of a module. In some embodiments, surface 362 is made from ferrous materials, such as steel.

Figure 8:
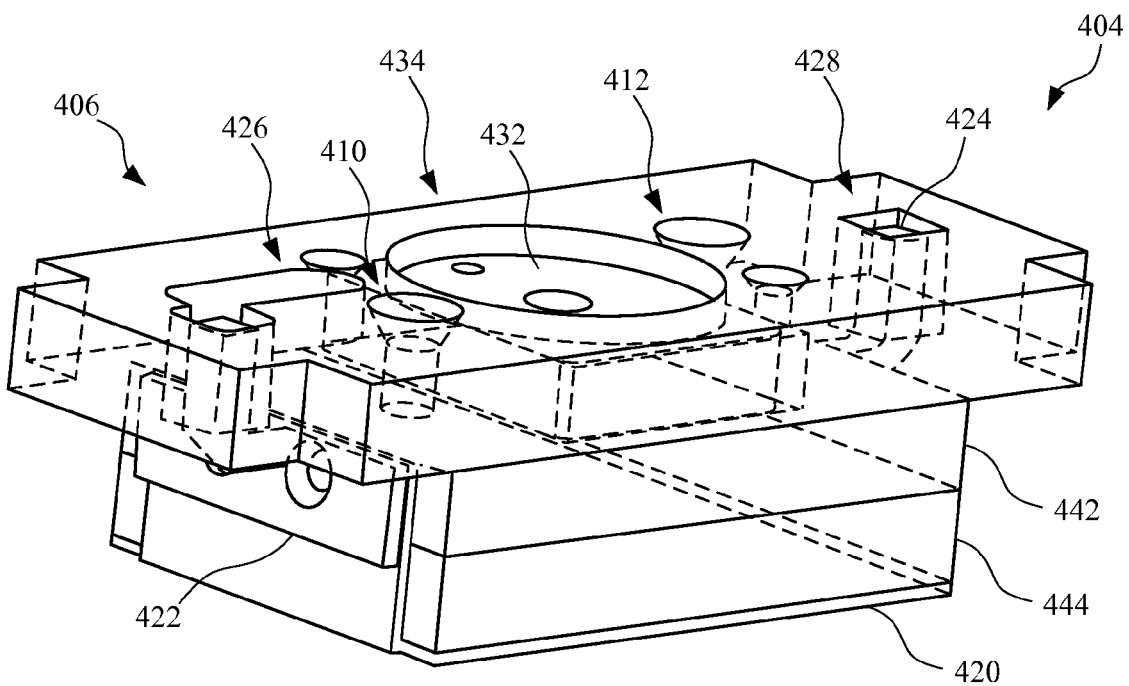
FIG. 8 illustrates an isometric view of an embodiment of a module used to calibrate an electronic device, in accordance with the described embodiments.

FIG. 8 illustrates an isometric view of an embodiment of module 404 used to calibrate an electronic device, in accordance with the described embodiments. Module 404 may be configured to couple with an end unit, such as end unit 332 shown in FIG. 7. Module 404 may include plate 406 configured to mate with a surface of an end unit, such as surface 362 shown in FIG. 7. In some embodiments, plate 406 is formed from a magnetically attractable metal or metals. Plate 406 may include first opening 410 and second opening 412 configured to receive alignment pins, such as first alignment pin 352 and second alignment pin 354 shown in FIG. 7, thereby providing a guide to properly couple an end unit to module 404.

Also, one end of module 404 may include stimulus member configured to stimulate or arouse an electronic device. In some embodiments, stimulus member 420 includes a conductive rubber used to engage the electronic device and provide a stimulus to a touch sensor of the device. In other embodiments, stimulus member 420 is a material configured to absorb light, including infrared light. In some embodiments, the material is a gray paper. In some embodiments, the material is a flock paper. When stimulus member 420 is a light-absorbing material, stimulus member 420 may be positioned over a proximity sensor of an electronic device. In this manner, stimulus member 420 may interact with the electronic device by receiving infrared light emitted from the proximity sensor in order to calibrate the proximity sensor. For example, stimulus member 420 may be positioned at a desired distance from the proximity sensor in a manner that simulates a user holding the electronic device near the user. Stimulus member 420 assists in calibration and testing by setting the sensor to a desired switching point, that is, a point in which the proximity sensor determines an object is within a desired proximity such that the sensor sends an electrical switching signal to the electronic device.

Stimulus member 420 may be coupled to first bracket 422 and second bracket 424. In some embodiments, first bracket 422 and second bracket 424 are formed metallic materials, such as copper or beryllium copper. Generally, first bracket 422 and second bracket 424 may be made of any electrically conductive material or materials. A portion of first bracket 422 and second bracket 424 extend through third opening 426 and fourth opening 428, respectively, of plate 406. Also, when module 404 is engaged with an end unit, first bracket 422 and second bracket 424 are configured to engage pins, such as first pin 342 and second pin 344 shown in FIG. 7. As a result, stimulus member 420 is part of an electrical circuit having a common, isolated ground with a connector (e.g., connector 252 in FIG. 4). Further, as shown in FIG. 8, first bracket 422 and second bracket 424 may include a size such that a gap exists between first opening 410 and second opening 412, respectively, thereby further ensuring electrical isolation from other structures. It should be noted that not all modules require the electrical isolation described, and accordingly, may not include first bracket 422 and second bracket 424.

Module 404 may further include block 432 accessible by fifth opening 434 of plate 406. Fifth opening 434 is generally of a size and shape to allow a structure, such as magnet 350 (shown in FIG. 7), to engage block 432. Block 432 may be made from a magnetically attractable ferrous material or materials in order to magnetically couple module 404 to an end unit, such as end unit 332 shown in FIG. 7. Further, the electromagnetic of the end unit may include a magnetic field attracted to block 432, and may be configured to create an opposing magnetic field that repels block 432. In this regard, block 432 is formed from relatively strong ferromagnetic materials. However, block 432 includes a relatively low magnetic remanence, that is, there is minimal, if any, magnetization present in block 432 when a magnetic field (such as magnet 350 or an electromagnet) is removed from block 432 or is no longer proximate to block 432.

Module 404 may further include first block 442 and second block 444, both of which are made from non-conductive materials. First block 442 may include materials such as glass-reinforced epoxy laminates sheets. In some embodiments, first block 442 is made from FR 4 material. Second block 444 may be made from a compliant foam material or materials, thereby allowing stimulus member 420 adequate compression, which may be useful as stimulus member 420 may be used for numerous cycles. Also, first bracket 422 and second bracket 424 may provide structural support to first block 442 and second block 444.

Also, while module 404 is shown having particular dimensions, the dimension of module 404 may vary according to the electronic device to be calibrated and tested. For example, module 404 may include larger or smaller dimension to accommodate stimulus member 420 having larger or smaller dimensions, respectively. Also, a rack previously described is capable of receiving modules (e.g., module 404) of various dimensions.

Figure 9:
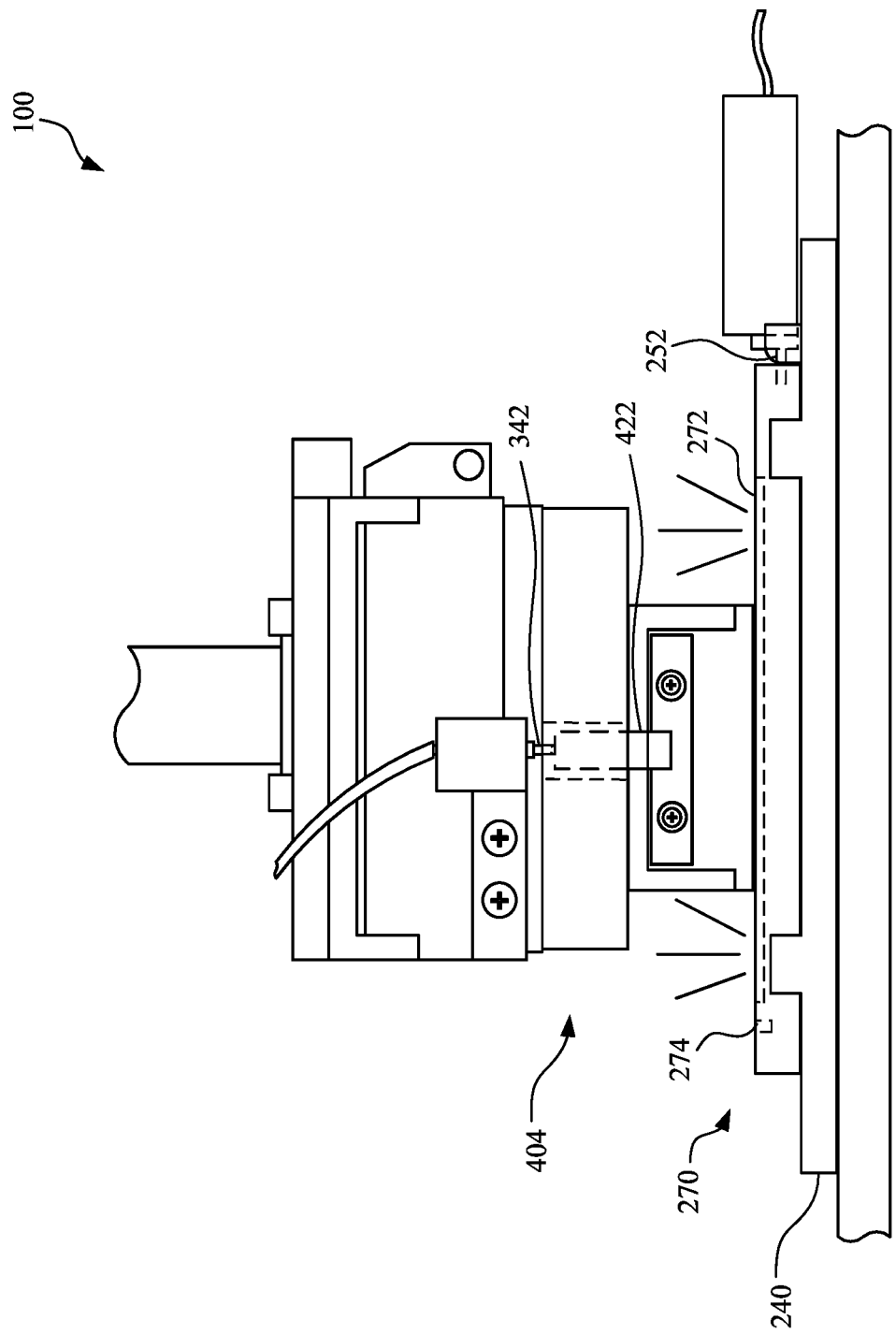
FIG. 9 illustrates a side view of an enlarged portion of an embodiment of a fixture performing a calibration of an electronic device, in accordance with the described embodiments.

FIG. 9 illustrates a side view of an enlarged portion of an embodiment of fixture 100 performing a calibration of electronic device 270, in accordance with the described embodiments. Some components of fixture 100 are not shown for purposes of clarity. As shown, end unit 332 is coupled to module 404 and positioned over electronic device 270 positioned within cradle 240. Also, first pin 342 is electrically and mechanical engaged with first bracket 422 to provide an isolated electrical ground for stimulus member 420. Also, in this embodiment, stimulus member 420 is a conductive rubber configured to calibrate touch sensors (not shown) integrated with display panel 272 of electronic device. In other embodiments, stimulus member 420 in a paper material previously described and configured to absorb infrared light emitted from proximity sensor 274 of electronic device 270.

As shown in FIG. 9, when connector 252 is electrically connected to device, fixture 100 along with an executable program may send an electrical signal to electronic device 270 such that electronic device 270 displays visual content from display panel 272. This allows for improved electronic device 270 to be calibrated under the influence of display panel 272 thereby providing improved calibration.

Figure 10:
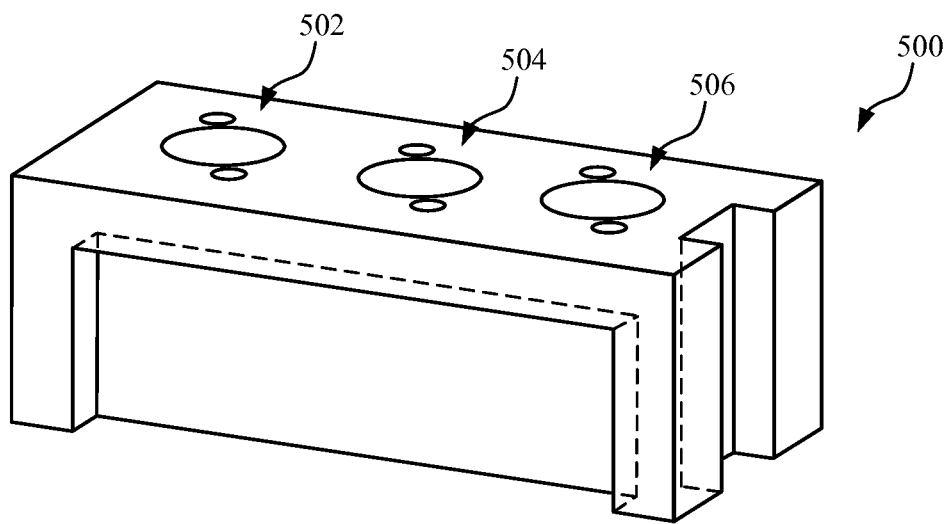
FIG. 10 illustrates an isometric view of a block used to assemble components of a fixture, in accordance with the described embodiments.
Figure 11:
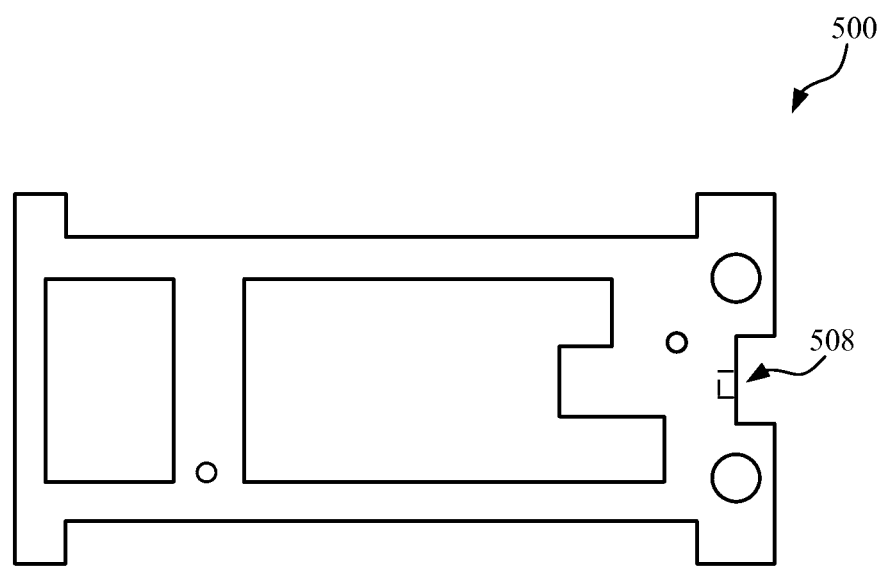
FIG. 11 illustrates a bottom view of the block shown in FIG. 10.

Rather than assembling the components of a fixture and performing a subsequent calibration, other techniques may be available to provide a fixture with consistent, repeatable assembly of components. For example, FIGS. 10 and 11 illustrate an embodiment of block 500 used to assist in building a fixture, in accordance with the described embodiments. Block 500 may be used as a reference datum in which the components may be built around block 500. Block 500 may also be used as a validation step for quality assurance.

FIG. 10 illustrates an isometric view of block 500. Block may be made from a metallic substrate, such as aluminum. Block 500 may be made from a material removal process having tightly controlled tolerances. For example, block 500 includes several openings, such as first opening 502, second opening 504, and third opening 506. First opening 502, second opening 504, and third opening 506 may be formed with tolerances approximately in the range of 5 to 50 micrometers, or microns. Generally, the process for building a fixture with block 500 may include placing block 500 on a plate (such as plate 206, shown in FIG. 2), connecting block 500 to a connector (such as connector 252, shown in FIG. 4), and placing an end unit (such as end unit 232, shown in FIG. 2) of a robotic assembly including an end unit, an actuator, and in some cases, a robotic arm. Subsequent steps may include attaching initial components to the end units, and then attaching subsequent components to the initial components. In this manner, block 500 serves as a reference datum for all fixtures and calibration of components (assembled without block 500) is not required. This allows for fixtures having a consistent placement of components which is important for machinery used for calibration.

FIG. 11 illustrates a bottom view of block 500 shown in FIG. 10. As shown, a material removal process may be performed to hollow out block 500. This may be done in order to create block 500 having less weight and/or to allow block 500 rest evenly on some surfaces having protrusions or other uneven portions. FIG. 11 may further include opening 508 configured to receive a connector to ensure block 500 is compliant.

Figure 12:
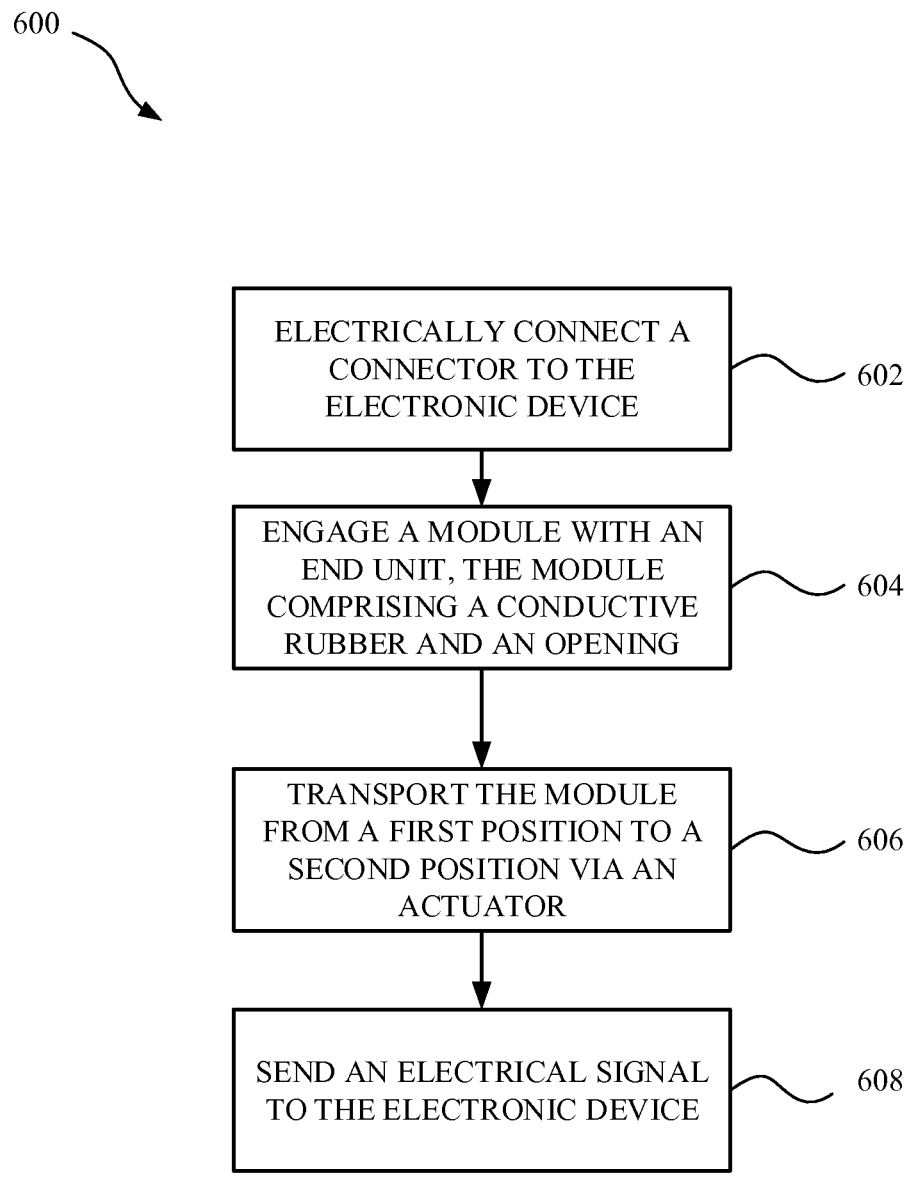
FIG. 12 illustrates a flowchart showing a method for calibrating an electronic device.

FIG. 12 illustrates a flowchart 600 showing a method for calibrating an electronic device. In step 602, a connector is electrically connected to the electronic device. The connector may be part of a fixture used in conjunction with an executable program. An electrical signal may be sent to the electronic device via the connector. The electrical signal may activate a sensor or sensors in the electronic device.

In step 604, a module is engaged with an end unit. The module may include a conductive rubber and an opening. The conductive rubber and the opening may be at opposite ends of the module. The conductive rubber is configured to engage the electronic device to stimulate a sensor, as part of the calibration process. Also, the end unit may include an alignment pin that extends through the opening in order to align the module with the end unit. The end unit may also include a magnet to magnetically couple with the module.

In step 606, the module is transported from a first position to a second position via an actuator. The second position is associated with a location such that the conductive rubber engages a touch sensor of the electronic device to perform a calibration previously described. When the calibration is complete, the end unit may transport the module back to the first position and disengage from the module. Then, the end unit may select a different module from rack having several modules.

In step 608, an electrical signal is sent to the electronic device. The electrical signal may activate the touch sensor. The electrical signal can also cause the display panel to emit visible light.

Figure 13:
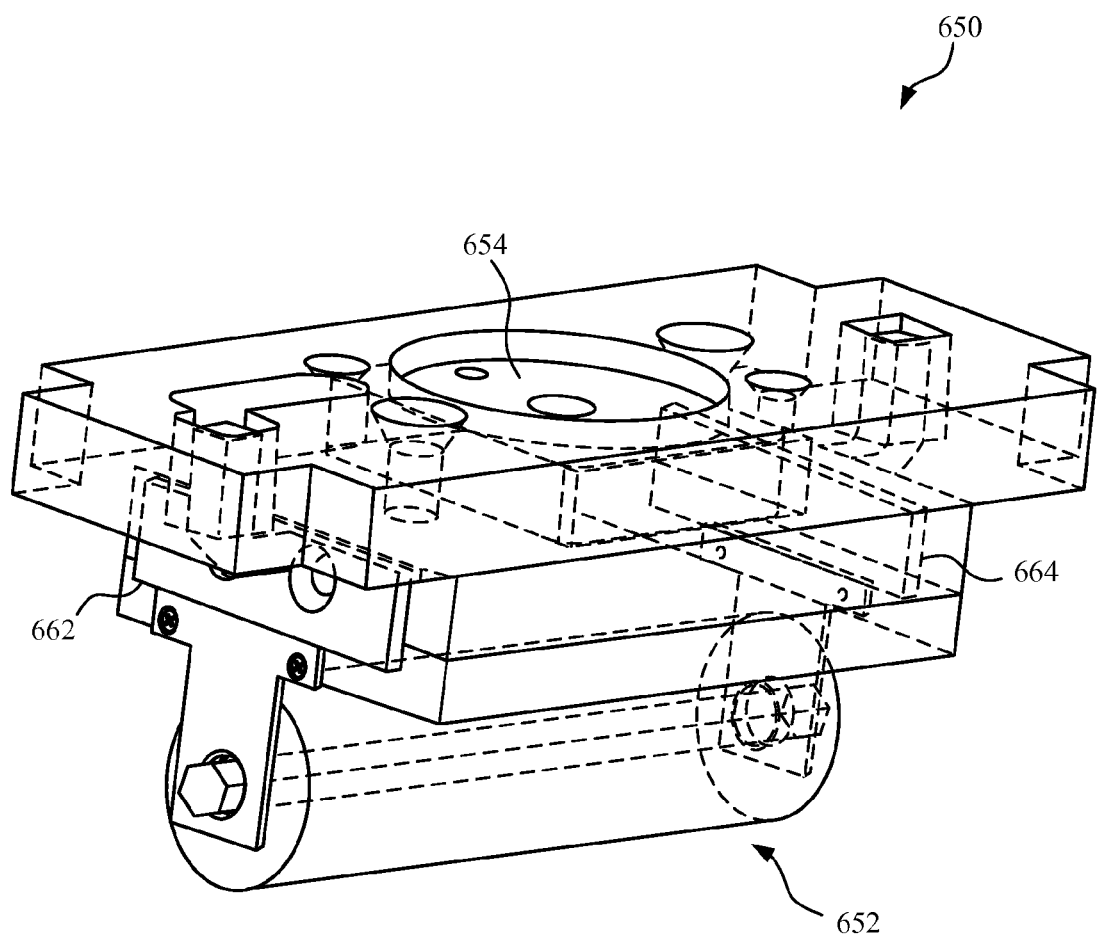
FIG. 13 illustrates an isometric view of a module having a rolling member, in accordance with the described embodiments.

In instances when an internal power source (e.g., battery) is repaired or replaced within an electronic device, the internal power supply may be adhesively secured to the device. FIG. 13 illustrates an isometric view of module 650 having rolling member 652, in accordance with the described embodiments. Rolling member 652 is configured to rotate clockwise and counterclockwise when engaged with an object and actuated along the object. Rolling member 652 may be made from a material or materials such as plastic or other polymeric materials. Module 650 may include block 654, which may include any features previously described for block 432 (in FIG. 8). In this manner, the electronic device, having a repaired or replaced internal power supply, may be placed in a fixture, such as fixture 100 (shown in FIG. 2). And end unit, such as end unit 332 (shown in FIG. 7), may engage module 650 positioned on a rack, such as first rack 202 or second rack 204 (shown in FIG. 2), and transport module 650 to the electronic device. An actuator attached to the end unit is configured to actuate the end unit along a surface of the internal power supply in order to secure another surface of the internal power supply. This ensures the internal power supply is adhesively secured to the electronic device in a desired manner.

Also, module 650 may include first bracket 662 and second bracket 664 configured to provide an electrical ground for module 650. In this regard, first bracket 662 and second bracket 664 may be electrically connected to rolling member 652. First bracket and second bracket 664 may be made from any material or materials previously described for first bracket 422 and second bracket 424 (shown in FIG. 8). In other embodiments, module may not include first bracket 662 and second bracket 664.

Figure 14:
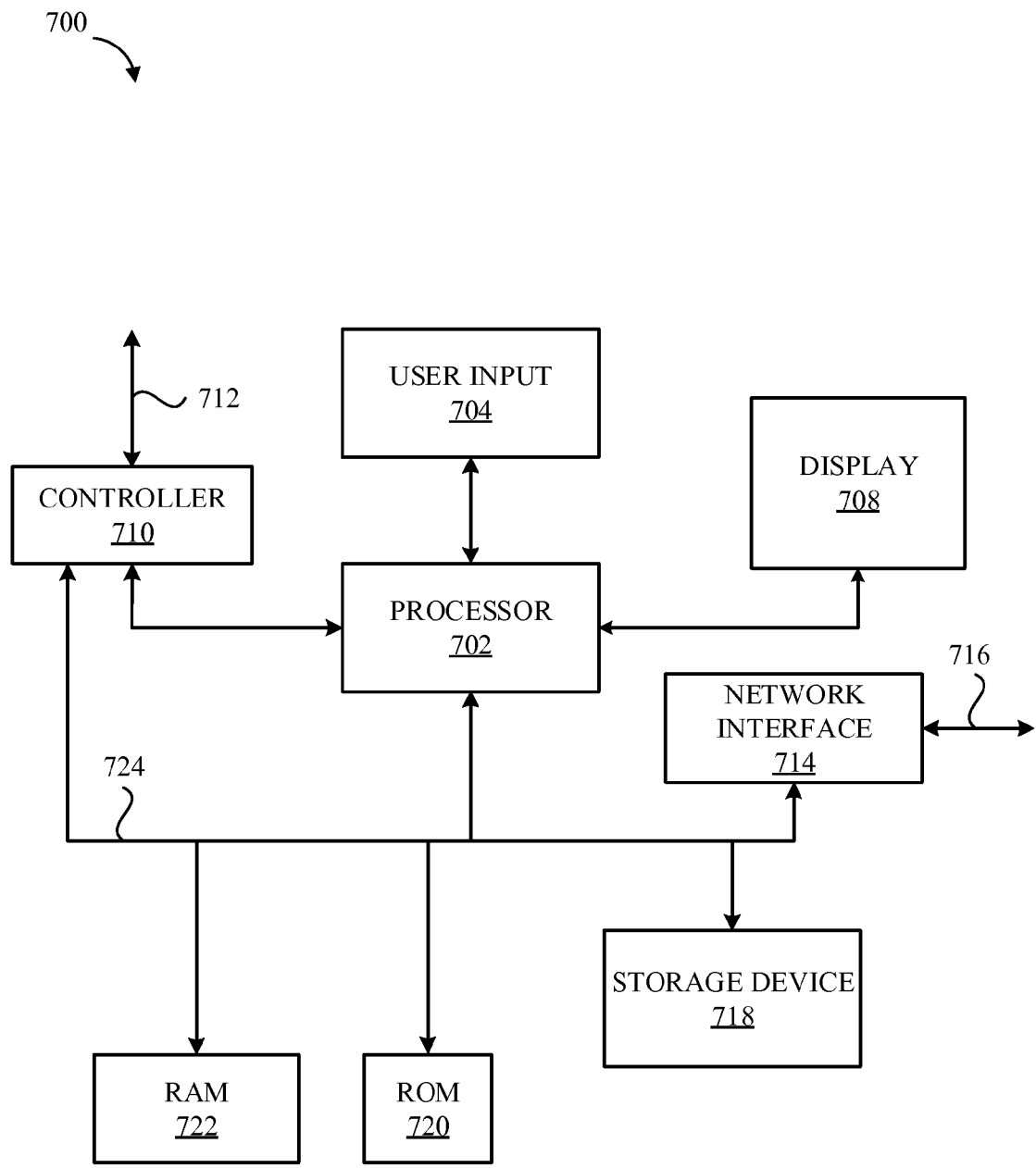
FIG. 14 illustrates a block diagram of a computing device that can represent the components of a computing device having an executable program used with a fixture, in accordance with the described embodiments.

FIG. 14 illustrates a block diagram of computing device 700 that can represent the components of a computing device having an executable program used with a fixture, in accordance with the described embodiments. It will be appreciated that the components, devices or elements illustrated in and described with respect to FIG. 13 may not be mandatory and thus some may be omitted in certain embodiments. Computing device 700 can include processor 702 that represents a microprocessor, a coprocessor, circuitry and/or a controller for controlling the overall operation of computing device 700. Although illustrated as a single processor, it can be appreciated that processor 702 can include several processors. These processors can be in operative communication with each other and can be collectively configured to perform one or more functionalities of computing device 700 as described herein. In some embodiments, processor 702 can be configured to execute instructions that can be stored at computing device 700 and/or that can be otherwise accessible to the processor 702. As such, whether configured by hardware or by a combination of hardware and software, processor 702 can be capable of performing operations and actions in accordance with embodiments described herein.

Computing device 700 can also include user input device 704 that allows a user of computing device 700 to interact with computing device 700. For example, user input device 704 can take a variety of forms, such as a button, keypad, dial, touch screen, audio input interface, visual/image capture input interface, input in the form of sensor data, etc. Still further, computing device 700 can include display 708 (screen display) that can be controlled by processor 702 to display information to a user. Controller 710 can be used to interface with and control different equipment through equipment control bus 712. Computing device 700 can also include network/bus interface 714 that couples to data link 716. Data link 716 can allow computing device 700 to couple to a host computer or to accessory devices. Data link 716 can be provided over a wired connection or a wireless connection. In the case of a wireless connection, network/bus interface 714 can include a wireless transceiver.

Computing device 700 can also include storage device 718, which can have a single disk or a plurality of disks (e.g., hard drives) and a storage management module that manages one or more partitions (also referred to herein as "logical volumes") within storage device 718. In some embodiments, storage device 718 can include flash memory, semiconductor (solid state) memory or the like. Still further, computing device 700 can include Read-Only Memory (ROM) 720 and Random Access Memory (RAM) 722. ROM 720 can store programs, code, instructions, utilities or processes to be executed in a non-volatile manner. RAM 722 can provide volatile data storage, and store instructions related to components of the storage management module that are configured to carry out the various techniques described herein. Computing device 700 can further include data bus 724. Data bus 724 can facilitate data and signal transfer between at least processor 702, controller 710, network/bus interface 714, storage device 718, ROM 720, and RAM 722.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for calibrating one or more electronic devices, the system comprising:
   a first module that calibrates a first component of an electronic device, the first module comprising:
      first end having a stimulus member:
      second end opposite the first end, the second end having a magnetically attractable member; and
      a bracket formed from a metallic material, the bracket electrically connected to the stimulus member;
   a second module that calibrates a second component of the electronic device, the second module comprising:
      a first end having a material capable of absorbing infrared light; and
      a second end opposite the first end, the second end having a magnetically attractable member;
   a sensor;
   a cradle that receives the electronic device, the cradle comprising an element detected by the sensor to identify the cradle; and
   an end unit attached to an actuator, wherein the end unit and the actuator move the first module from a first position to a second position, wherein the second position is proximate to the electronic device.

2. The system of claim 1, further comprising a rack, wherein the rack holds the first module and the second module, the rack further comprising a lock that prohibits the first module and the second module from movement by the end unit and the actuator.

3. The system of claim 2 further, comprising a connector, wherein the connector is capable of electrically connecting to the electronic device.

4. The system of claim 3, the end unit further comprising an electrically conductive element, wherein the connector and the stimulus member have a common electrical ground when the electrically conductive element engages the bracket, and wherein the actuator electrically grounded to a second electrical ground different from the common electrical ground.

5. The system of claim 4, wherein the electrically conductive element is a pin.

6. The system of claim 1, the cradle further comprising a plurality of protrusions, wherein the plurality of protrusion comprises a first protrusion and a second protrusion, the first protrusion and the second protrusion having a height less than a height of the electronic device.

7. The system of claim 1, further comprising a second rack, the second rack comprising a third module and a fourth module.

8. The system of claim 7, wherein the cradle is capable of being removed and replaced by a second cradle configured to receive a second electronic device different from the electronic device, and wherein the end unit and the actuator move the third module from a third position to a fourth position.

9. The system of claim 1, wherein the:
   the first component is a touch sensor of the electronic device, the second component is a proximity sensor of the electronic device, and the stimulus member comprises a conductive rubber.

10. A system for calibrating electronic devices, the system comprising:
a rack that holds a module, the module including:
a plate that includes a first opening, a second opening, and a third opening,
a first block;
a second block engaged with the first block;
a stimulus member engaged with the second block;
a bracket engaged with the stimulus member; and
a block formed from a magnetically attractable material; and
an end unit including:
a surface that engages the plate;
a first pin configured to pass through the first opening and engage the bracket;
a second pin configured to pass through the second opening to align the module with the end unit; and
a magnet that engages the block formed from the magnetically attractable material.

11. The system of claim 10, further comprising a second rack that includes a second module, wherein the module of the rack calibrates a sensor of a first electronic device, and the second module of the second rack calibrates a sensor of a second electronic device.

12. The system of claim 10, the rack comprising a lock that regulates the module from being removed from the rack via the end unit.

13. The system of claim 12, wherein the lock comprises a lock door and a rack knob, the rack knob configured to actuate the lock door.

14. The system of claim 10, further comprising a cradle that receives an electronic device.

15. The system of claim 14, the cradle comprising a protrusion that aligns the electronic device, wherein the protrusion includes a height less than a height of the electronic device.

16. A system for calibrating sensors in electronic devices, the system comprising:
a first rack having a first plurality of modules, the first plurality of modules comprising:
a first module having a first stimulus member formed from a conductive rubber; and
a second module having a second stimulus member formed from a material selected from gray paper and flock paper;
a second rack having a second plurality of modules, the second plurality of modules comprising a third module having a dimension greater than a dimension of the first module and greater than a dimension of the second module; and
an end unit capable of transporting any one of the first module, the second module, and the third module to a cradle;
wherein:
the first plurality of modules calibrate a first electronic device, and
the second plurality of modules calibrate a second electronic device different from the first electronic device.

17. The system of claim 16, further comprising a second cradle that receives the second electronic device when the cradle is removed.

18. The system of claim 17, wherein the cradle includes a first plurality of magnets to form a magnetic polarity in a first configuration, and wherein the second cradle includes a second plurality of magnets to form a magnetic polarity in a second configuration different from the first configuration.

19. The system of claim 18, further comprising a first sensor and second sensor, the first sensor and the second sensor capable of detecting the magnetic polarity in the first configuration and the magnetic polarity in the second configuration.

20. The system of claim 16, the end unit further comprising a pin formed from an electrically conductive material, and the first module comprising a bracket formed from an electrically conductive material, the bracket engaged with the first stimulus member.

* * * * *